P. E. FELLOWS.
TIGHTENING DEVICE FOR ANTISKID CHAINS.
APPLICATION FILED JULY 25, 1921.
1,423,202.  Patented July 18, 1922.
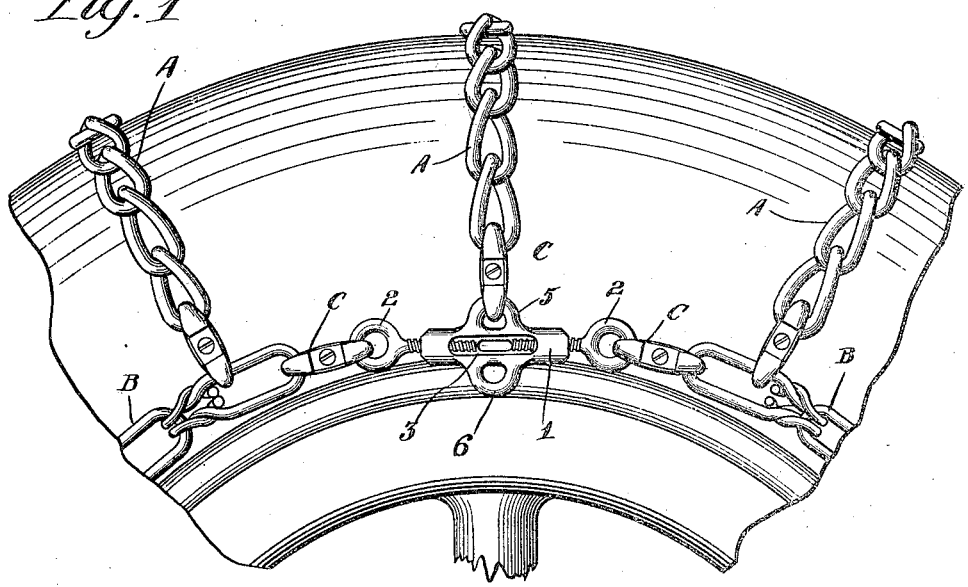
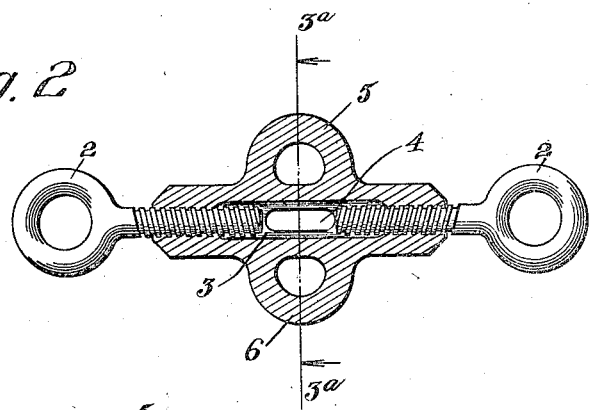
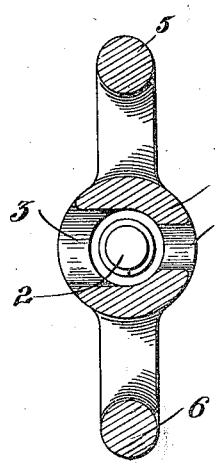
INVENTOR
Perry E. Fellows
BY
Frederick S. Church
his ATTORNEY.

UNITED STATES PATENT OFFICE.

PERRY E. FELLOWS, OF ROCHESTER, NEW YORK.

TIGHTENING DEVICE FOR ANTISKID CHAINS.

1,423,202.

Specification of Letters Patent. Patented July 18, 1922.

Application filed July 25, 1921. Serial No. 487,304.

*To all whom it may concern:*

Be it known that I, PERRY E. FELLOWS, a citizen of the United States, and resident of Rochester, in the county of Monroe and State of New York, have invented certain new and useful Improvements in Tightening Devices for Antiskid Chains; and I do hereby declare the following to be a full, clear, and exact description of the same, reference being had to the accompanying drawings, forming a part of this specification and to the reference numerals marked thereon.

My present invention relates to tire chains and, more particularly, to devices for tightening or drawing up the side chains of antiskid devices and hence fitting or tightening the chains against the tires. The object of the invention is to provide a simple, cheap and convenient means whereby the side chain may be easily and quickly adjusted to fit the particular tire to which it is applied.

A further object of this invention is to provide, in the same structure, means for the attachment of the usual cross chains to the side chain thus making it possible to use a device necessary to produce the desired tension at a point where connection must be provided for the cross chains.

Another object of this invention is to provide the device with means for the attachment of tension springs, which are sometimes used to take up slack in the chain and extend diametrically of the wheel. To these and other ends the invention consists in certain improvements and combinations of parts, all as will be hereinafter more fully described, the novel features being pointed out in the claims at the end of the specification.

In the drawings:

Figure 1 is a view of a portion of an antiskid tire chain in place upon a fragment of tire with my improved tightening device or turn buckle applied thereto.

Figure 2 is a longitudinal sectional view through my improved device, and

Figure 3 is a section on the line 3ª—3ª of Figure 2.

Similar reference numerals throughout the several views indicate the same parts.

I have illustrated my invention in the present instance in connection with a well known type of tire chain which, referring more particularly to the drawings, comprises a plurality of spaced cross chains A having their ends joined at intervals to circumferential side chains B of about the diameter of the wheel, but considerably less than the extreme diameter of the tire whereby each element holds the other in place. When the chain as a whole is to be removed, the ends of the side chains B are disconnected and the chain lifted off. In my prior Patent No. 1,368,030 of February 8, 1921, I disclose a convenient form of intermediate link designed to facilitate this disconnection and connection as well as that of the cross chains A to the side chains B, and such links are herein illustrated in use at C, but they form no part of the present invention which is directed to means for adjusting or tightening the chain about the tire by drawing the ends of the side chains together with or without the use of the links C.

In the practice of my present invention, I provide a device consisting of an elongated body portion 1 having right and left hand screw eyes 2 threaded into its opposite ends and partially occupying a lateral cavity 3 in the body portion through which an opening 4 extends. The eyes 2 are connected to the respective ends of the side chains B, in the present instance through the medium of the links C previously referred to. By turning the body portion 1 in one direction, the said ends are drawn together because of the right and left hand threads on the shanks of the screw eyes and the chain is tightened about the tire, while turning it in the opposite direction loosens the chain as will be understood, all, however, without twisting the chain in any way. A tool may be inserted through the opening 4 to turn the body portion, but it may best be turned in another way as will be described, the opening 4 being chiefly useful as a means of access for removing mud and dirt from the cavity 3 about the threads of the screw eyes.

On opposite sides of the body portion 1 form lateral central loops or eyes 5 and 6. In the position of Figure 1, the loop 5 is used for the attachment of a cross chain A, again in the present instance through the medium of one of the links C. This not only permits the use of a cross chain at the point where the ends of the side chain B meet or are connected, but the attachment of the cross chain prevents the body portion 1 from turning in use and changing the adjustment between the ends of the side chain.

The other loop 6, in the position shown, may be used for the connection of one of the tensioning devices for keeping the slack out of tire chains and preventing them from being noisy, which tensioning device is usually a coiled spring (not shown) extending diametrically of the wheel and tire. Of course eyes 5 and 6 are alternatively used for both purposes according to which is outermost and which innermost when the body member 1 has been rotated on the screw eyes to the desired point of adjustment.

The eyes 5 and 6 give a flatness or irregularity to the body member that provides a grip for the fingers of the operator in adjusting the body member by hand, and they also provide for cooperation with a tool applied to the body member to rotate it in case it does not turn easily.

More than one of my take up devices may, of course, be applied at intervals around the circumferences of the side chains, an increase in the number used of course giving a greater range of adjustment.

I claim as my invention:

1. An adjusting device for antiskid tire chains comprising a body portion having a laterally arranged member for the attachment of the cross chain and an adjustable member at each end adapted for connection with the adjacent end of the side chain.

2. An adjusting device for antiskid tire chains comprising a body portion having an adjustable member at each end adapted for connection with the adjacent end of the side chain and two laterally arranged members on its opposite sides adapted for attachment to a cross chain and to a tension device spanning the wheel.

3. An adjusting device for antiskid tire chains comprising a body portion having right and left hand screw eyes at its ends adapted for connection with the adjacent end of the side chain, and an intermediate lateral eye for the purposes set forth.

PERRY E. FELLOWS.